(12) United States Patent
Ryu et al.

(10) Patent No.: US 8,054,530 B2
(45) Date of Patent: Nov. 8, 2011

(54) E-PAPER PANEL

(75) Inventors: Byung-Gil Ryu, Seoul (KR);
Soon-Hyung Kwon, Seoul (KR);
Sung-Guk Lee, Seoul (KR);
Moon-Bong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 11/315,193

(22) Filed: Dec. 23, 2005

(65) Prior Publication Data

US 2006/0139301 A1 Jun. 29, 2006

(30) Foreign Application Priority Data

Dec. 27, 2004 (KR) .................. 10-2004-0113230

(51) Int. Cl.
*G02B 26/00* (2006.01)
(52) U.S. Cl. ..................................... 359/291
(58) Field of Classification Search .......... 359/290–298; 430/31–32, 109.3, 109.4, 111.4; 345/107; 399/45, 66, 69, 111, 124, 125, 322, 335, 399/397; 219/216; 432/60
See application file for complete search history.

(56) References Cited

U.S. PATENT DOCUMENTS

| | | | |
|---|---|---|---|
| 4,181,563 A * | 1/1980 | Miyaka et al. ................. 216/13 |
| 6,144,361 A * | 11/2000 | Gordon et al. ............... 345/107 |
| 6,222,513 B1 * | 4/2001 | Howard et al. ................ 345/84 |
| 6,842,278 B1 * | 1/2005 | Sakamaki et al. ............ 359/296 |
| 7,327,346 B2 * | 2/2008 | Chung et al. ................. 345/107 |
| 7,405,865 B2 * | 7/2008 | Ogiwara et al. ............. 359/296 |
| 2002/0018043 A1 * | 2/2002 | Nakanishi ................... 345/107 |
| 2002/0122237 A1 * | 9/2002 | Sandstrom et al. .......... 359/291 |
| 2002/0150886 A1 * | 10/2002 | Miles et al. ...................... 435/5 |
| 2003/0214697 A1 * | 11/2003 | Duthaler et al. ............. 359/296 |
| 2003/0231162 A1 * | 12/2003 | Kishi .......................... 345/107 |
| 2004/0263947 A1 * | 12/2004 | Drzaic et al. ................. 359/296 |
| 2005/0024710 A1 * | 2/2005 | Kanbe .......................... 359/296 |
| 2005/0173249 A1 * | 8/2005 | Barlow et al. ................ 204/601 |

FOREIGN PATENT DOCUMENTS

JP 2002062847 A * 2/2002
* cited by examiner

*Primary Examiner* — Ricky Mack
*Assistant Examiner* — Mahidere S Sahle
(74) *Attorney, Agent, or Firm* — Birch, Stewart, Kolasch & Birch, LLP

(57) ABSTRACT

An electrode of an E-paper panel having a lattice structure, wherein an electric field concentrated on edge regions of the electrode is dispersed, and thus while driving a cell, charged particles are uniformly distributed over an entire region of the cell, thereby improving display performance. For this purpose, the E-paper panel includes a driving electrode integrally driven by a driving signal for driving a cell, a portion of the driving electrode corresponding to the cell region being partially removed according to a particular pattern.

15 Claims, 8 Drawing Sheets

FIG. 1
PIROR ART

FIG. 2A
PIROR ART

FIG. 2B
PIROR ART

FIG. 2C
PIROR ART

FIG. 2D
PIROR ART

FIG. 2E
PIROR ART

FIG. 2F
PIROR ART

FIG. 3
PIROR ART

E-PAPER PANEL

BACKGROUND OF THE INVENTION

1. Field of the Invention

The present invention relates to an electronic paper (E-paper) panel, and particularly, to an E-paper panel capable of improving a cell displaying performance.

2. Background of the Related Art

Necessity of various display devices has led to a development of an electronic paper (referred to as 'E-paper') technology capable of providing clear images for a longer time using a smaller amount of driving power.

The E-paper technology is directed to displaying colors by electrostatically moving charged particles floating within a particular space using a rapid movement of micro particles by an electric field. Here, after the movement in any pole, the positions of the particles may not be changed even if a voltage is removed due to a memory effect. Accordingly, images may not be disappeared to thus obtain an effect that the images are likely printed on a paper with an ink. That is, the E-paper panel does not self-emit light but a visual fatigue thereby is extremely low to allow a user to comfortably view the images as if he reads a book. Also, the E-paper panel has a superior flexibility to thus be bent well and is formed to be very thin. Also, as aforementioned, once images are displayed, the images keep being displayed for a long time until the panel is reset. Accordingly, a power consumption thereof may be remarkably low to thus be popularly used as a portable display panel. In particular, a low fabricating cost according to simple processes and low-priced materials may allow a popularity of the E-paper panel.

Figure 1:
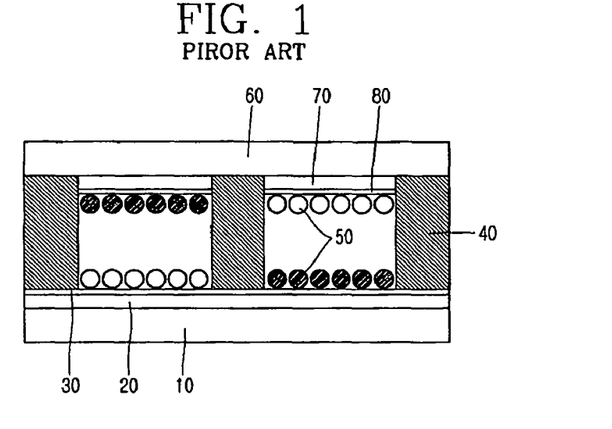
FIG. 1 is a sectional view illustrating a structure of a related art E-paper panel.

FIG. 1 is a sectional view illustrating a related art collisional charging type E-paper panel using dry particles. The related art collisional charging type E-paper panel has a simple structure in which walls 40 are positioned between lower and upper substrates 10 and 60 having transparent electrodes (i.e., Indium Tin Oxides (ITOs)) 20 and 70 thereon, respectively, which are coated with insulating layers 30 and 80, respectively, and plus-charged toner particles and minus-charged toner particles are positioned within spaces sectionalized (secured) by the walls 40.

The lower substrate 10 and the upper substrate 60 are not limited in their thickness. However, it should be considered that the thickness (i.e., several tens through several hundreds μm) of the actual wall 40 and sizes of the toner particles 50 are remarkably minute because the toner particles 50 should be moved by an electrostatic force. As compared to the thickness of each of the lower and upper substrates 10 and 60, the thickness of each electrode 20 and 70 is far thinner than that shown in the drawing. Also, it should also be considered that the thickness of each insulating layer 30 and 80 respectively coated on the electrodes 20 and 70 is also very thin.

An operational principle of the E-paper panel having such structure will now be explained. First, it is assumed that black toner particles are minus-charged and white toner particles are plus-charged (they may be charged vice versa). Upon applying a minus (−) voltage to the upper electrode 70 and a plus (+) voltage to the lower electrode 20, the plus-charged white toner particles move toward the upper substrate 60 by a coulomb force, while the minus-charged black toner particles move toward the lower substrate 10 thereby. The white toner particles 50 are positioned at a portion where the upper substrate 60 is positioned, and thus cells may be displayed as a white color when viewed from the exterior. On the other hand, upon applying the plus (+) voltage to the upper electrode 70 and the minus (−) voltage to the lower electrode 20, the minus-charged black toner particles move toward the upper substrate 60, while the plus-charged white toner particles move toward the lower substrate 10. Accordingly, cells may be displayed as the black color. Hence, after first applying a voltage to allow all the cells to be displayed as the white color, an opposite voltage to the voltage is applied to thus allow only desired cells to be displayed as the white color, thereby enabling a representation of pictures or characters.

FIGS. 2A through 2F are sectional views illustrating sequential steps of a fabricating process of the related art dry-type E-paper panel shown in FIG. 1.

Figure 2A:
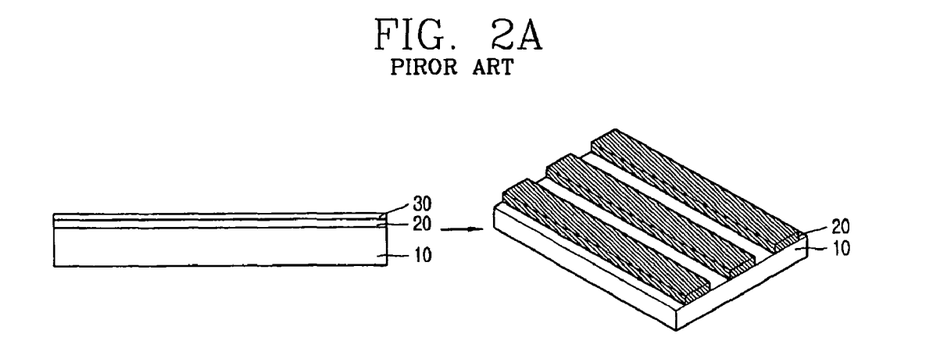
FIGS. 2A through 2F are sectional views illustrating sequential steps of a related art E-paper panel fabrication method.

As illustrated in FIG. 2A, the transparent lower electrode 20 and the insulating layer 30 are sequentially formed on the lower substrate 10. The E-paper panel uses a matrix structure as its basic electrode structure, and thus the lower electrode 20 may have the shape shown in a perspective view illustrated at the right side of the drawing. Such transparent electrodes are preferably formed of the ITO. The insulating layer 30 applied on the lower electrode 20 does not affect the cell driving although it is not disposed. However, the charged toner particles contact with the electrode 20 which causes a reduction of a memory effect when an electron mobility is generated. As a result, it may be difficult to maintain images for a long time. Therefore, the insulating layer 30 may preferably be applied accordingly.

Figure 2B:
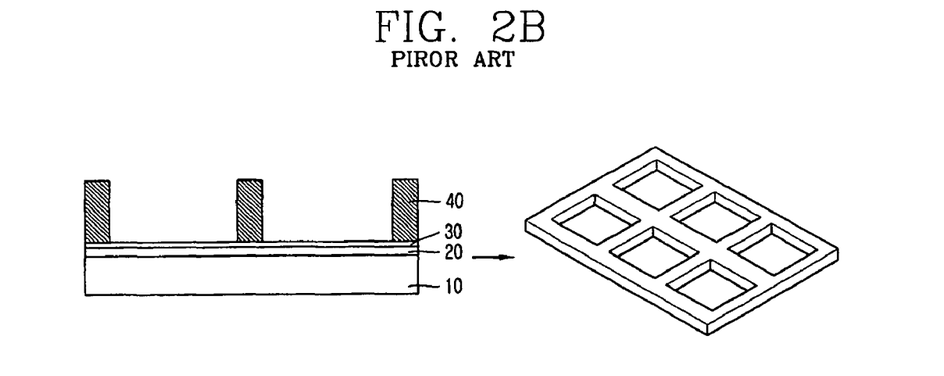

As illustrated in FIG. 2B, the walls 40 are formed on the lower substrate 10. The wall 40 is simply used to divide a cell unit, and thus various materials such as polymer, inorganic materials, or the like can be used to form the wall 40. In general, the wall 40 can be constructed using such methods, namely, a photolithography method using a photoresist, a method using a photosensitive polymer, a laminating method using a previously-made material by cutting it, and the like. The cut material may be applied onto the previously-formed lower plate (including the lower substrate 10, the lower electrode 20 and the lower insulating layer 30) using ultraviolet (UV) adhesive and UV irradiation. A typical wall 40 may have a lattice structure as shown in the right perspective view in the drawing.

Figure 2C:
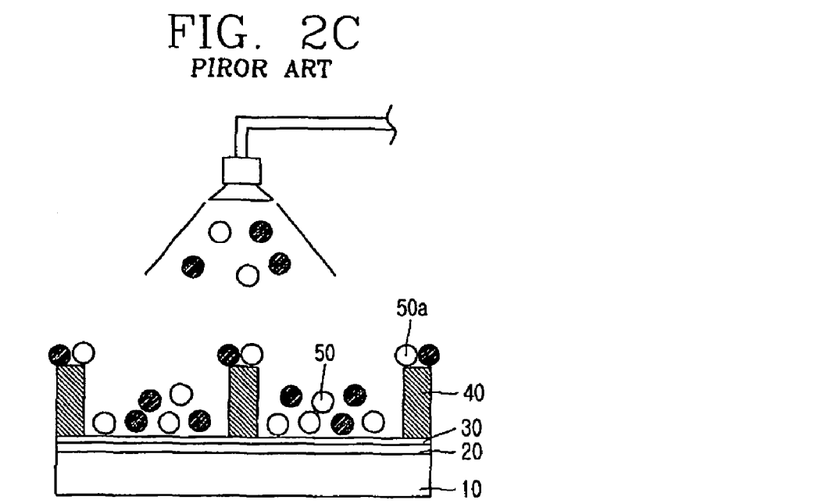

As illustrated in FIG. 2C, a corona discharge is used to inject the minus-charged toner particles 50 into the spaces divided by the walls 40 through a nozzle. At this time, a means for applying a positive voltage to the lower electrode 20 or applying a positive electric field to a lower portion of the lower substrate 10 may further be provided to thus allow the injected toner particles 50 to be easily moved into the spaces sectionalized by the walls 40. The toner particles 50 internally include additives for adjusting charging characteristics. When the toner particles 50 collide with one another, the charging characteristics are generated. Accordingly, although the toner particles 50 are minus-charged for the injection thereof, when a current is applied to the electrodes after completing the panel formation, the toner particles can find their own charging characteristics.

Figure 2D:
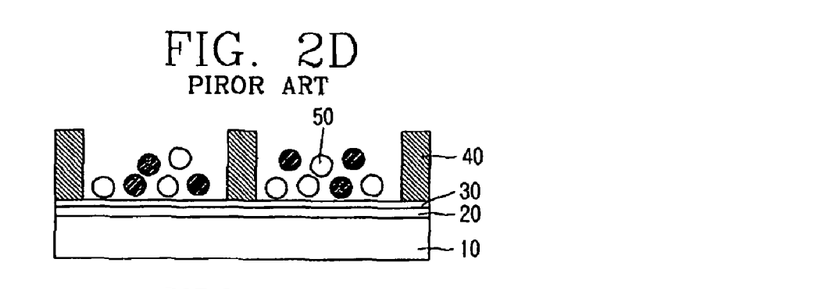

As illustrated in FIG. 2D, the toner particles 50a positioned at an upper portion of the wall 40 can be swept out using various methods. Most typically, the toner particles 50a on the upper portion of the wall 40 can be swept out by adhering them using a roller on which an adhesive is applied. Also, a separate mask is disposed on the wall 40 to inject the toner particles 50a into the spaces sectionalized by the walls 40, and thereafter the corresponding mask can be removed therefrom.

Figure 2E:
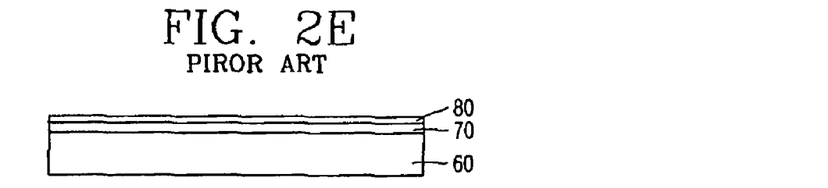

As illustrated in FIG. 2E, the transparent upper electrode 70 and the upper insulating layer 80 are sequentially formed on the upper substrate 60 using the same process as that for forming the lower plate in order to use them as an upper plate (i.e., including the upper substrate 60, the upper electrode 70 and the upper insulating layer 80). Here, the upper electrode 70 can have the same structure as shown in FIG. 2A, but it should be arranged to be orthogonal to the lower electrode 20.

Figure 2F:
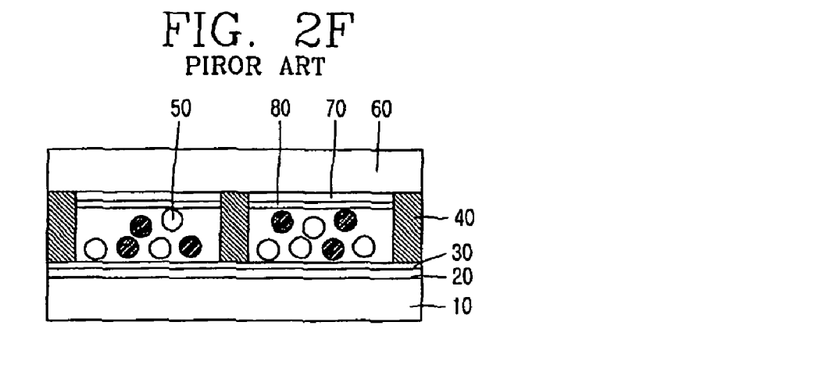

As illustrated in FIG. 2F, the formed upper plate (i.e., the upper substrate 60, the upper electrode 70 and the upper insulating layer 80) is disposed on the walls 40 formed on the lower plate (i.e., the lower substrate, the lower electrode 20 and the lower insulating layer 30) to be then attached thereon. Thereafter, if necessary, the toner particles 50 are collided with one another by repeatedly applying an opposite voltage to each electrode, alternately. Accordingly, each toner particle 50 may be minus-charged or plus-charged.

The dry type E-paper panel has superior response time and processing facilitation as compared to a liquid type panel, but has inferior cell displaying performance and contrast characteristics.

Figure 3:
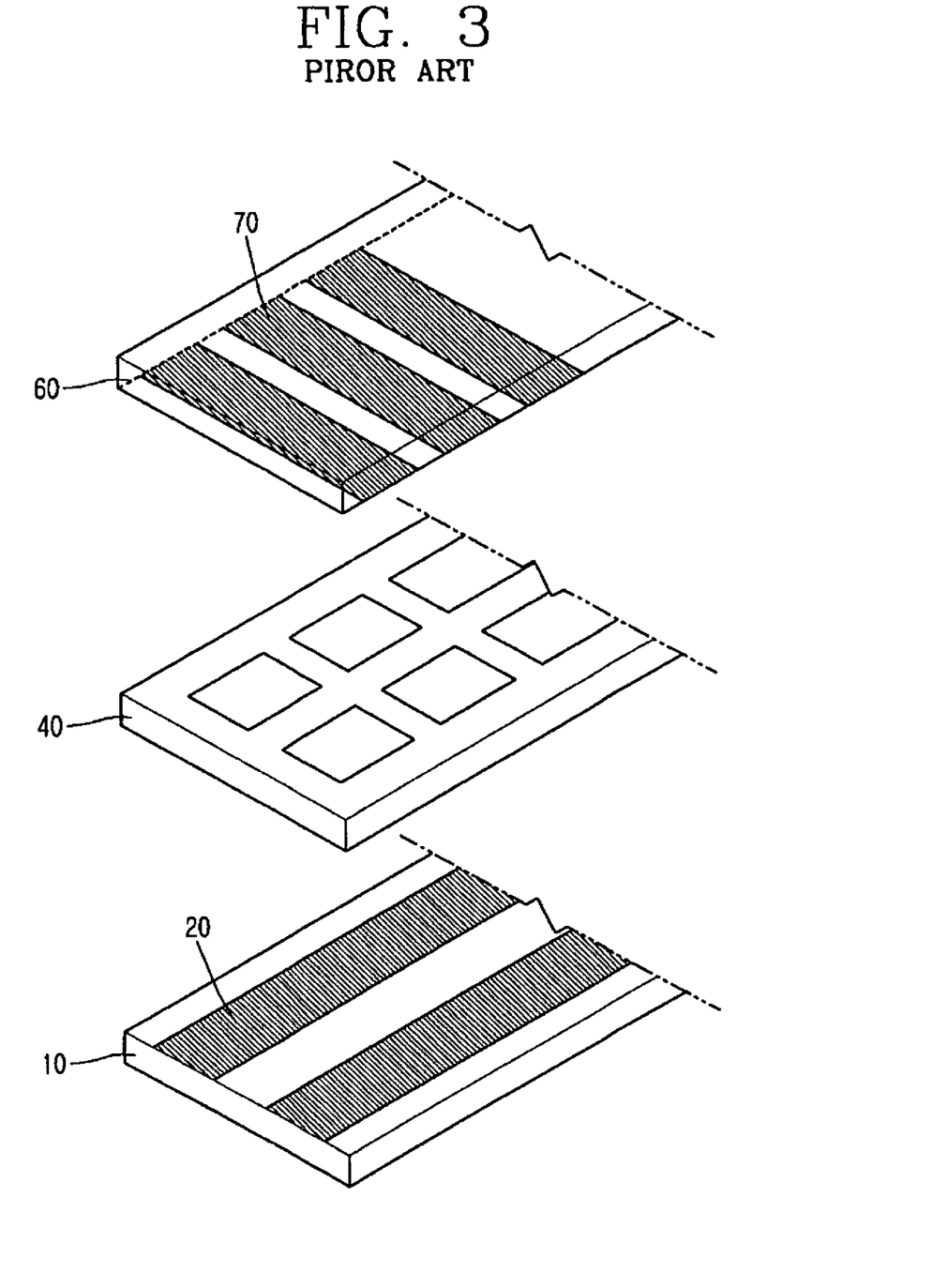
FIG. 3 is an assembled perspective view illustrating a structure of upper and lower electrodes of the related art E-paper panel.

FIG. 3 is an assembled perspective view illustrating upper and lower electrodes and walls forming a display cell of the related art E-paper panel. According to this drawing, the structure of the electrodes forming one cell can be checked in three dimensions.

As illustrated in FIG. 3, it can be noted that each of the upper and lower electrodes 70 and 20 respectively positioned at the upper and lower portions of a cell sectionalized by the wall 40 can be formed of one conductor plate per one line. An individual electrode managing each line (i.e., a scan line or data line operated by a single signal) is formed of a single conductor plate which is thin and flat. Accordingly, an electric field generated by applying a high voltage is concentrated on edge portions of the conductor plate and weakened at the center portion thereof. Hence, while driving the cell, the toner particles within the cell is not positioned at the center portion of the electrode but rather positioned at the edge portions thereof, thereby degrading the contrast characteristics of the panel.

Figure 4:
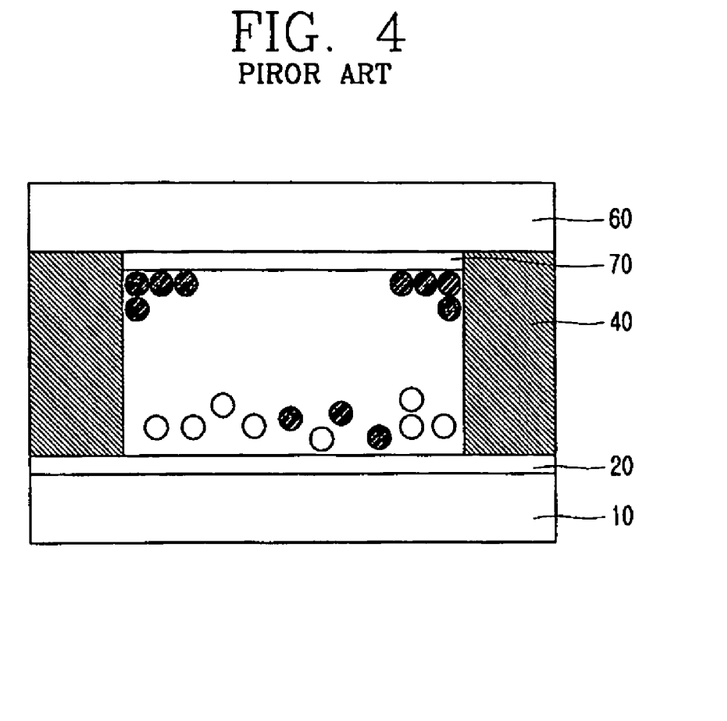
FIG. 4 is a sectional view illustrating an operation characteristic of the related art E-paper panel.

FIG. 4 illustrates an operational state of a cell using the electrode having the structure shown in FIG. 3. As illustrated therein, as the panel is driven, the toner particles of the corresponding cell vertically moves. Accordingly, the toner particles are moved toward both the edge portions of the electrode on which the electric field is concentrated more strongly. The toner particles are not then positioned at the center portion of the electrode along a formation path of the electrode as illustrated in the drawing, but rather aggregated densely onto certain zones of the edge portions. That is, the center portion of the cell which should be visually displayed as the toner color can not be represented with colors. As a result, the contrast characteristics are deteriorated and thereby quality of displayed images are drastically degraded.

BRIEF DESCRIPTION OF THE INVENTION

Therefore, an object of the present invention is to provide an Electronic paper (E-paper) panel in which an electric field provided to one cell is dispersed to thus allow a uniform distribution of toner particles.

According to another object of the present invention, there is provided an electron structure of an E-paper panel in which an electric field provided to toner particles can uniformly be distributed only by forming at least one electrode of upper and lower electrodes of an E-paper panel to have a plurality of edge regions, without separately changing a driving method or providing a complicated structure.

According to still another object of the present invention, there is provided an E-paper panel in which a lattice pattern is formed at an upper or lower electrode according to sizes of toner particles to thus increase uniformity of an arrangement of toner particles and to thus improve resolution (or contrast) thereby.

According to yet another object of the present invention, there is provided an E-paper panel capable of improving contrast characteristics and color representation by uniformly distributing toner particles while driving a cell.

According to yet another object of the present invention, there is provided an E-paper panel fabrication method capable of reducing a fabricating cost by improving uniformity of toner particles only by changing a mask pattern for executing a patterning of an upper or lower electrode without performing any separate process or changing any processing condition.

To achieve these and other advantages and in accordance with the purpose of the present invention, as embodied and broadly described herein, there is provided an E-paper panel comprising: a cell region divided by walls and upper and lower substrates; charged toner particles distributed in the cell region; and upper and lower electrodes formed on the upper and lower substrates of the cell region, respectively, wherein the upper electrode and/or the lower electrode have/has a pattern with a plurality of edge regions.

According to another embodiment of the present invention, an E-paper panel device can comprise: a lower electrode formed on a lower substrate; an electrically single upper electrode formed on an upper substrate and having a plurality of removed regions; walls sectionalizing cell regions partitioned between the upper and lower substrates; and charged toner particles contained in each cell region sectionalized by the walls.

According to still another embodiment of the present invention, an E-paper panel can comprise a driving electrode integrally driven by a driving signal for driving a cell, a portion of the driving electrode corresponding to the corresponding cell region being partially removed according to a particular pattern.

To achieve these and other advantages and in accordance with the purpose of the present invention, as embodied and broadly described herein, an E-paper panel fabrication method comprising: preparing a lower substrate sectionalized by walls and having a lower electrode pattern; forming a transparent electrode on an upper substrate, and performing a patterning such that the transparent electrode is electrically isolated according to a cell region and a portion of the transparent electrode corresponding to the cell region is allowed to have a plurality of removed regions; injecting charged toner particles into the regions sectionalized by the walls formed on the lower substrate and attaching the lower substrate and an upper substrate to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

FIGS. 5A through 5D illustrate various electrodes 100 having a few kinds of structures in accordance with an embodiment of the present invention. One of the patterned upper electrode 100 can be applied to all types of E-paper panels for moving charged particles based upon an electric field. Here, an explanation of the present invention will be made using an exemplary collisional charging type E-paper panel.

As illustrated in FIGS. 5A through 5D, an E-paper panel in accordance with a first embodiment of the present invention may include a patterned upper electrode 100 (i.e., a single electrode driven based upon a separate scan line or data line) driven by a single signal and having a plurality of removed regions.

Figure 5A:
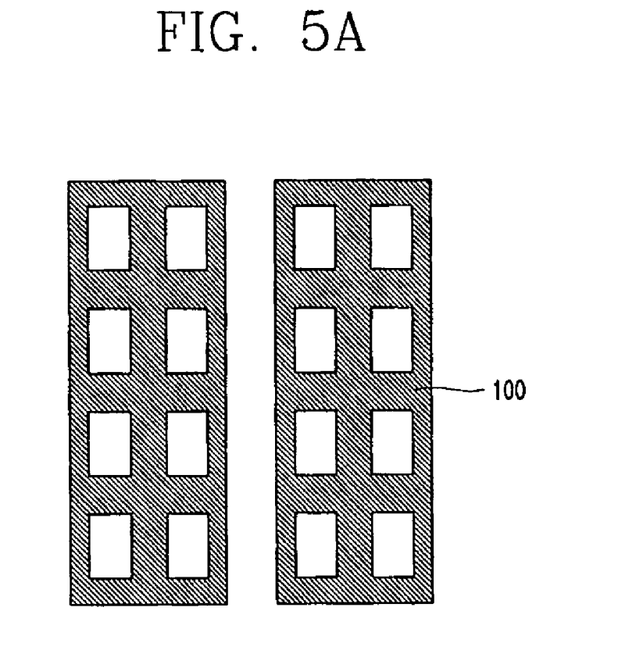
FIGS. 5A through 5D are sectional views illustrating structures of electrodes for E-paper panels in accordance with an embodiment of the present invention.
Figure 5B:
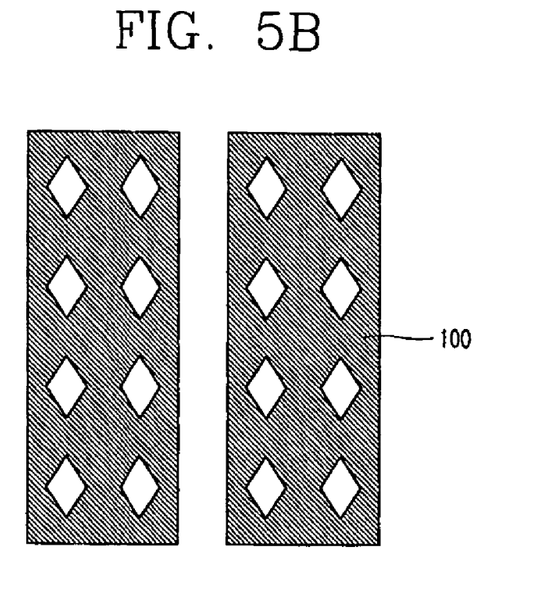
Figure 5C:
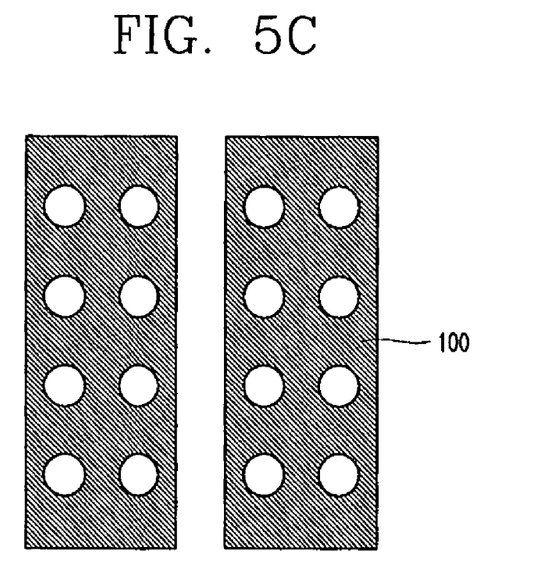
Figure 5D:
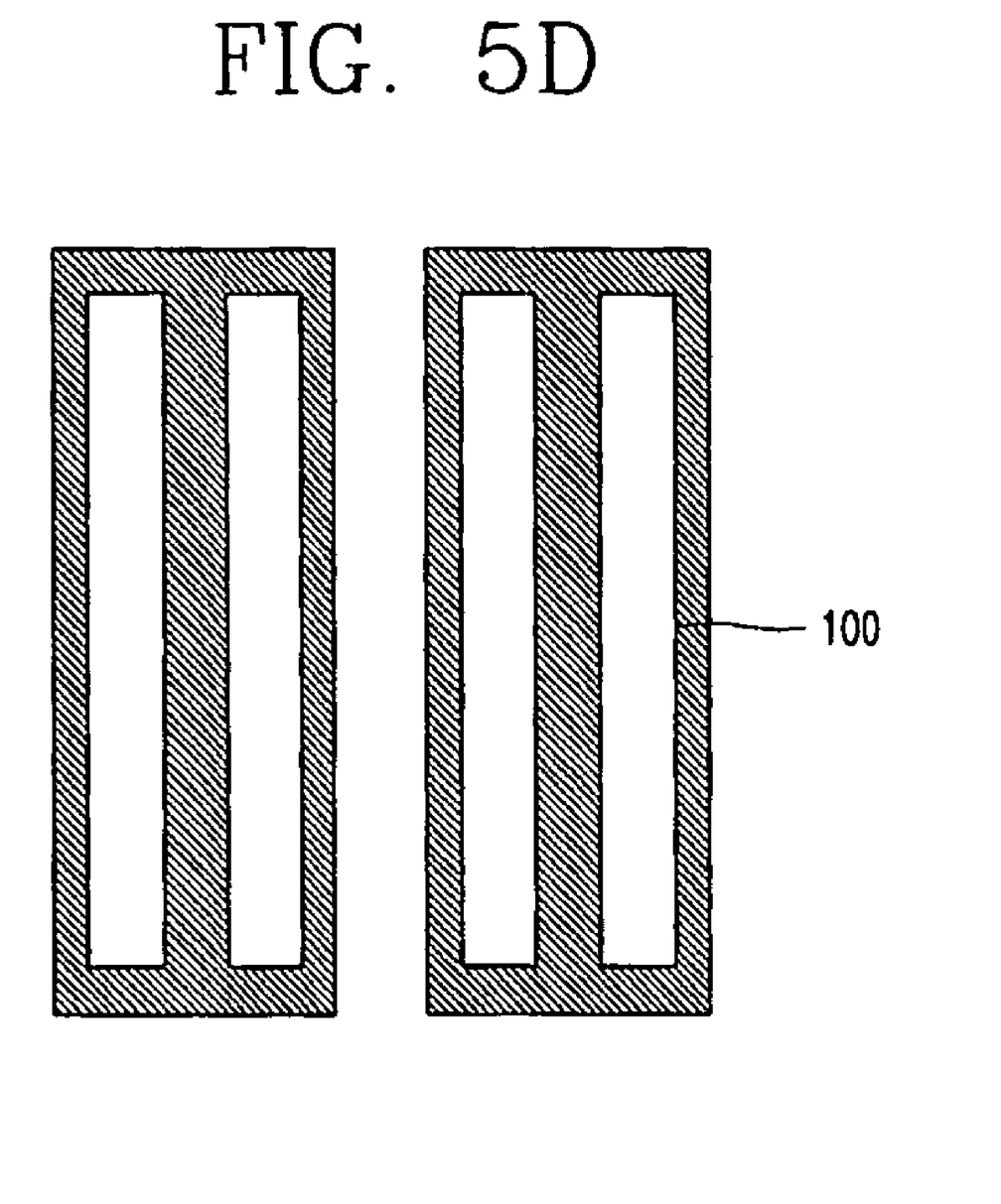

A pattern formed within a single electrode line has a simply square lattice pattern (FIG. 5A), a lozenge type (FIG. 5B) considering a current flow, a round type (FIG. 5C), or a stripe type (FIG. 5D) but may have other types of patterns such as a comb type, a meander type, and the like in case by case. Such patterns can be formed by removing particular inner regions of the single electrode line. Here, considering the square lattice pattern as illustrated in FIG. 5A, for instance, a removal of one square region newly generates four edge regions. In more detail, if ten square patterns were formed within a particular region of the single electrode line corresponding to one cell region, forty edge regions are newly formed within the single cell region. That is, for the related art E-paper panel having a matrix electrode structure in which the single electrode line is long formed by crossing a plurality of cell regions, only two edge regions are provided by one (upper or lower) electrode line corresponding to one cell region.

Thus, by adding the edge regions by removing inner regions of the single electrode line according to the particular pattern, a distribution of an electric field can be dispersed. That is, upon applying a voltage to one electrically single electrode, the electric field is formed on the basis of the edge regions, and thus the electric field can be aggregated densely at the edge regions. Hence, as aforementioned, if a plurality of patterns are formed at a single electrode line, a plurality of edge regions are added. Accordingly, the electric field is formed at the added edge regions. As a result, the electric field concentrated on both the edge regions of the single electrode line can be distributed to the edge regions in the electrode, thereby increasing uniformity of the electric field distribution in the entire regions of the cell.

That is, it is important to uniformly distribute the electric field generated in the single electrode when a voltage is applied to the electrode, by removing the inner regions of the single electrode line to construct the single electrode line to be in a state that a plurality of electrodes are electrically coupled to one another. Accordingly, toner particles moving toward the electrode can uniformly be distributed by uniformly dispersing the electric field distribution.

However, it should be considered that the electric field provided to one cell should be uniformly distributed by forming a plurality of lattice or comb type patterns in the electron region corresponding to one cell region. The size or location of the pattern should be determined by considering the sizes of the toner particles and a patterning resolution of the electrode to be realized. Therefore, the size, the arrangement interval or the like of the pattern to be formed within the electrode can be determined according to the plural considerations.

As explained above, the electrode structure in which the patterns are formed within the single electrode has been described. However, such structure was employed in order to effectively explain the method for removing partial regions within the single electrode according to patterns. Thus, in another method, it is possible that a plurality of electrodes may be electrically coupled to one another to thus arrange them to be operated as a single electrode. For example, if the electrode has the lattice pattern, it can be understood as the electrode has a structure in which minute electrodes are coupled to one another in vertical and horizontal directions. If the electrode has the comb or stripe type pattern, it can be understood as the electrode has a structure in which a plurality of minute electrodes are coupled to one another in a bias direction. However, such structures may substantially be the same in the manner that the electrodes are electrically connected to one another to be integrally driven according to the single driving signal, and plural edge regions are formed within the electrode.

Here, the electrical coupling does not mean only that the electrodes simply have regions to be physically coupled to one another. That is, the regions electrically coupled to one another may be provided in the illustrated square lattice structure, the exemplary comb type lattice structure, the exemplary lozenge type lattice structure, or the like. However, the single electrode having the stripe type pattern may be formed as a bit different structure. That is, although a plurality of electrodes having a narrow interval therebetween (i.e., disposing a plurality of electrodes within one cell region) is disposed in place of the conventional single electrode region, if the single driving signal is always commonly applied to the corresponding electrodes in the driving method, the electrodes can be determined as being electrically coupled to one another even if physically connected regions do not exist.

When fabricating the single electrode having the plurality of edge regions, only the mask for patterning is changed to thus perform the same process as the conventional process in which a transparent electrode is formed on the substrate to be patterned according to the cell driving method. Accordingly, any separate process or a change in the processing condition may not be required. That is, the conventional process can be used as it is, and thus additional cost may not be generated as well.

Figure 6:
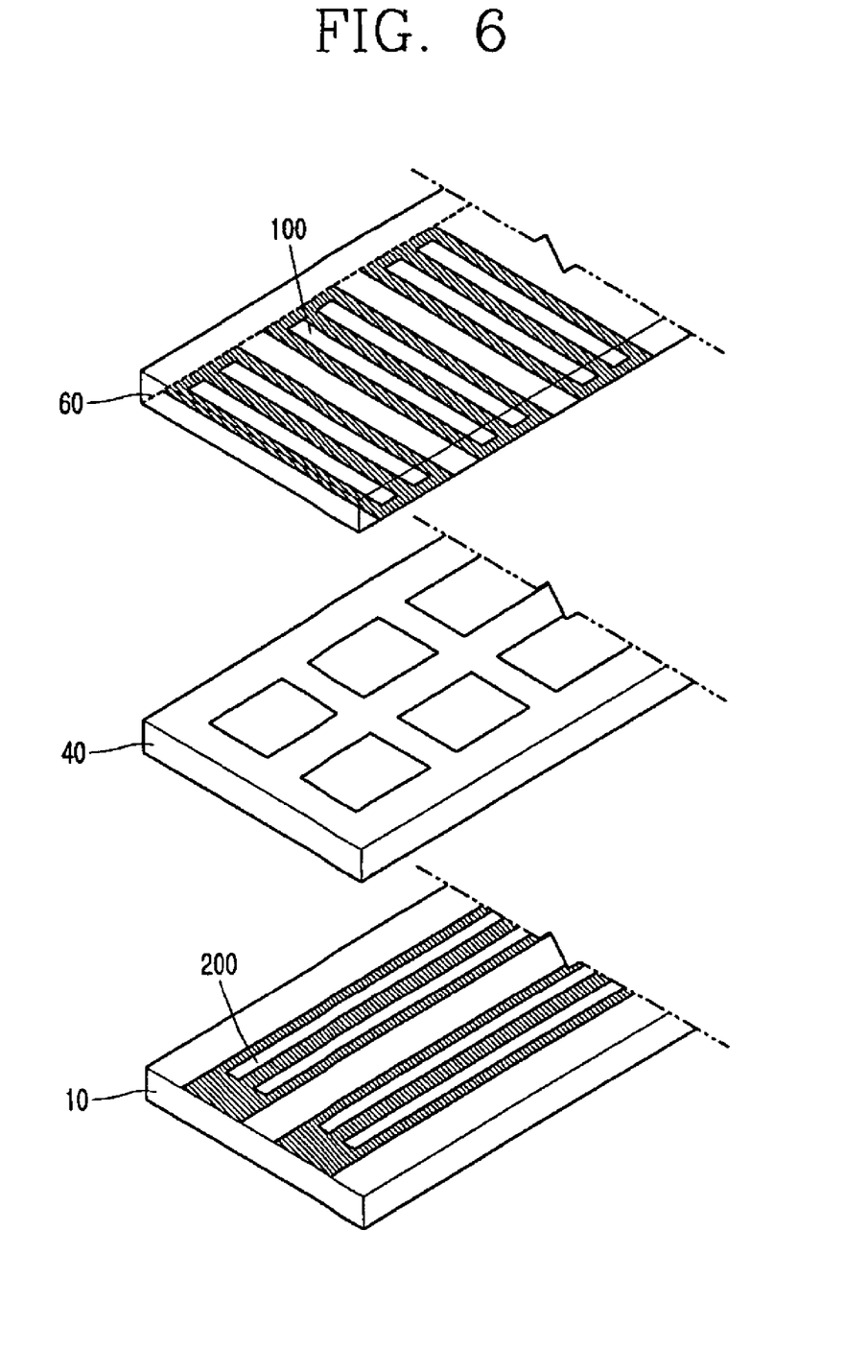
FIG. 6 is an assembled perspective view illustrating a structure of electrodes in accordance with another embodiment of the present invention.

FIG. 6 is an assembled perspective view illustrating both patterned upper and lower electrodes and walls forming a display cell of the E-paper panel.

As illustrated in FIG. 6, a plurality of stripe patterns are formed in the upper electrode region 100 and lower electrode region 200 managing one cell to thus disperse the electric field toward plural edge regions. As a result, it is possible to display images on both front and rear surfaces of the panel by uniformly distributed the toner particles.

Figure 7:
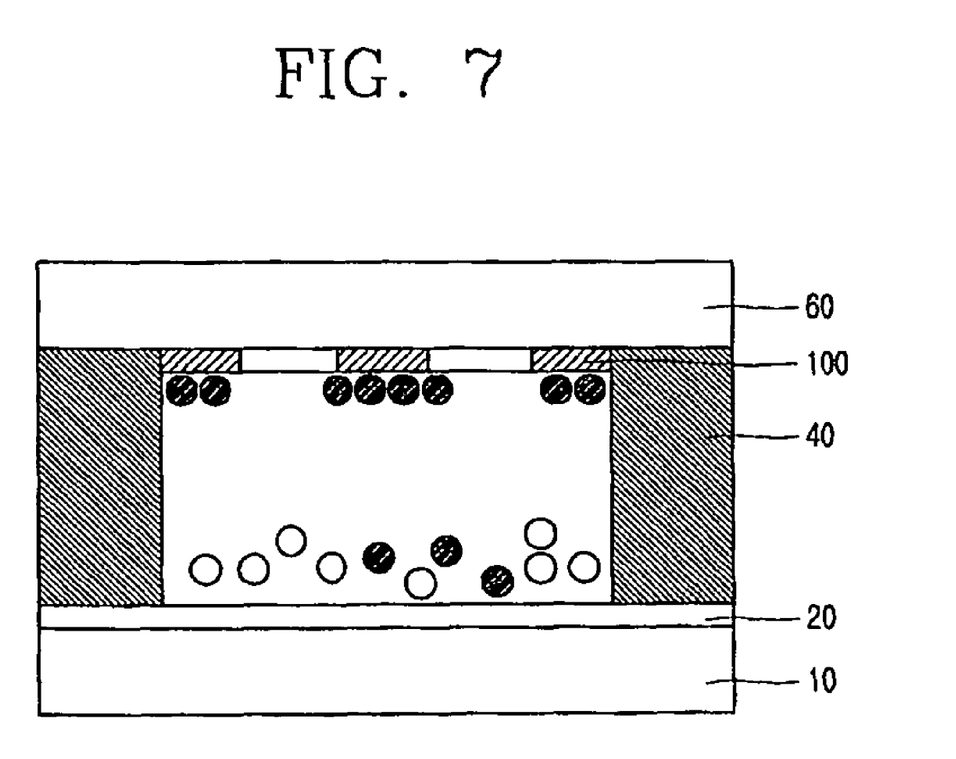
FIG. 7 is a sectional view illustrating an operation characteristic of the E-paper panel in accordance with an embodiment of the present invention.

FIG. 7 illustrates an operational state of the E-paper panel to which the upper electrode 100 shown in FIG. 5A is applied.

As illustrated in FIG. 7, a plurality of lattice patterns are formed in the electrode region 100 managing one cell to thus disperse the electric field toward plural edge regions. As a result, it can be noted that toner particles vertically move to be uniformly placed at every regions where the electrode is formed. That is, for visually checking the distribution, the toner particles are uniformly distributed at every regions of the cell and thus the operational state of the cell can be clearly checked.

Although the toner particles are represented in great sizes and the lattice patterns are represented in small numbers, if minute toner particles are uniformly distributed in much more lattice pattern edge regions, a display uniformity in the cell region can greatly be improved.

In the illustrated structure, the patterned upper electrode 100 is applied as the upper electrode, and a typical single plate electrode rather than the patterned upper electrode 100 is applied as the lower electrode 20.

A formation method of such structure illustrated in FIG. 7 and an implementation method thereof will be explained in more detail. First, the lower electrode 20 is formed on the lower substrate 10. The lower electrode 20 can be formed as an electrode having the lattice pattern as aforementioned, for example, as the electrode corresponding to the patterned lower electrode 200 of FIG. 6 (i.e., for a displaying images on both surfaces of the panel). For this case, the transparent electrode should be used as the lower electrode. Although not shown, an insulating layer can further be formed on the lower electrode 20. The insulating layer can decrease an electron mobility which may be generated when the toner particles are directly in contact with the lower electrode 20, thereby maintaining the memory effect.

The wall 40 is formed on the lower substrate 10 on which the lower electrode is formed. Various materials can be used to form the wall 40. The wall 40 is used to physically support the upper and lower substrates, to sectionalize cell spaces, and to trap the toner particles to be injected in the sectionalized spaces.

The toner particles are injected into the cell spaces sectionalized by the wall 40. The toner particles which are temporarily charged may be injected therein through a nozzle as aforementioned, or the toner particles are integrally injected and thereafter a ultrasonic vibration is applied thereto. The toner particles has additives for adjusting their charging characteristics, and thus an individual charging character thereof can be recovered by an alternating current (AC) voltage applied after completing the panel formation. In the illustrated drawing, the black toner particles and the white toner particles are allowed to have different charging characteristics from each other, and thereafter mixed for the injection thereof.

Upon forming a transparent electrode material on the upper substrate 60 and patterning the formed electrode, the patterned electrode material is electrically divided according to the cell region, and particular patterns are formed within the divided regions, thereby obtaining a patterned upper electrode 100. In the case, an insulating layer (not shown) can further be provided to prevent the toner particles from being directly in contact with the patterned upper electrode 100. As mentioned above, a separate process is not required to form the patterned upper electrode 100. Also, during the patterning process, a transparent conductive layer division for driving a cell and a pattern formation in the electrode for improving the electric field distribution may be simultaneously performed.

The prepared upper plate structures 60 and 100 is disposed to face the lower plate structures 10, 20 and 40 to be attached thereto. In the typical structure of the E-paper panel, the patterned upper electrode 100 is used as one of a data line or a scan line, and the lower electrode 20 is used as one of the scan line or the data line corresponding to the patterned upper electrode 100. The patterned upper electrode 100 and the lower electrode 20 are constructed based upon the matrix structure, and thus should be attached to each other in a direction that they perpendicularly cross each other. Afterwards, if necessary, the inner toner particles are collided with one another by alternately providing a voltage having a different polarity, respectively, to the patterned upper electrode 100 and the lower electrode 20. Accordingly, each toner particle is minus-charged or plus-charged.

For example, when the black toner particles are minus-charged and the white toner particles are plus-charged, if a positive voltage is applied to the patterned upper electrode 100 and a negative voltage is applied to the lower electrode 20, as illustrated in the drawing, the plus-charged white toner particles move toward the lower electrode 20, and the black toner particles move and are uniformly distributed at each edge region of the patterned upper electrode 100. At this time, if the types of the toner particles are diversified as plural groups having different sizes, masses, and/or charged degree, and then applied to the electrodes 20 and 100, gradation of images can effectively be represented.

Although the dry collisional charging type structure has been explained with reference to the embodiments according to the present invention, another embodiment may be available. That is, an electrophoresis type structure in which the cell region is filled with flux mixed with the charged toner particles may be used. Here, although the patterned upper electrode is applied to the E-paper panel having the electrophoresis type structure, the toner particles move in the electrode direction by the electric field as shown in the dry collisional charging type structure. Accordingly, an operation method and operational effect in the two structures may be the same. Therefore, the detailed structures shown in the embodiments may not limit the scope of the present invention. Also, the present invention can be applied to every types of E-paper panel structures which are operated by controlling the movement of the charged particles based upon the electric field.

As described above, in the E-paper panel according to the embodiments of the present invention, the electrode for managing one data line or scan line while forming the electrode can be allowed to have various types of lattice patterns. Accordingly, the electrode for managing a single cell can have the plurality of edge regions to disperse the electric field provided to the one cell. As a result, the toner particles can be uniformly distributed in the plurality of edge regions of the electrode while driving the cell, and thus the contrast characteristics of the panel and image qualities accordingly can effectively be improved.

In the E-paper panel according to the embodiments of the present invention, the patterns having the plurality of edge regions can be formed in the single electrode only by changing a patterning mask of the electrode without performing any separate process. Hence, the entire cell region can be displayed as a uniform color without an increase in fabrication cost or a decrease in yield.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An E-paper panel, comprising:
a cell region divided by a wall and upper and lower substrates;
charged toner particles dispersed in the cell region;
upper electrode and lower electrode formed on the upper and lower substrates of the cell region, respectively; and
a plurality of patterns with a plurality of edge regions, for dispersing an electric field provided to the cell region, wherein the plurality of patterns are a plurality of holes formed in an inner area of the upper electrode and/or the lower electrode in order to uniformly distribute the charged toner particles at the plurality of patterns.

2. The E-paper panel of claim 1, wherein each pattern with the plurality of edge regions is a lattice pattern which is obtained by regions removed as at least one type of polygonal type, comb type, lozenge type, round type, and stripe type.

3. The E-paper panel of claim 1, wherein the upper electrode and/or the lower electrode are/is constructed in a matrix structure so as to be spaced from each other based upon a line unit according to sizes of cells disposed based upon the line unit and to face each other in a direction orthogonal to each other.

4. The E-paper panel of claim 3, wherein the upper electrode and the lower electrode having the patterns with the plurality of edge regions have one or more regions for electrically connecting electrodes therebetween dispersed according to the pattern per each line.

5. The E-paper panel of claim 1, further comprising:
insulating layers positioned respectively on the upper electrode and the lower electrode formed on the upper and lower substrates of the cell region, respectively.

6. An E-paper panel device, comprising:
a lower electrode formed on a lower substrate;
an upper electrode formed on an upper substrate and having a plurality of removed regions;
walls to sectionalize cell regions partitioned between the lower substrate and the upper substrate; and
charged toner particles dispersed in the cell regions sectionalized by the walls,
wherein a plurality of patterns with a plurality of edge regions, for dispersing an electric field provided to one cell region, are formed in an inner region of the upper electrode in the one cell region in order to uniformly distribute the charged toner particles at the plurality of patterns, and
wherein the plurality of patterns are a plurality of holes formed in the inner region of the upper electrode in the one cell region.

7. The device of claim 6, wherein the plurality of removed regions provided in the upper electrode are removed according to at least one type of polygonal type, comb type, lozenge type, round type, and stripe type.

8. The device of claim 6, further comprising:
an insulating layer formed on at least one electrode of the upper electrode and the lower electrode.

9. An E-paper panel, comprising:
a first substrate;
a first electrode formed on the first substrate;
walls formed on the first substrate to sectionalize a cell region;
charged toner particles injected into the cell region sectionalized by the walls;
a transparent substrate disposed to be spaced from the first substrate by the walls therebetween; and
a second electrode formed on the transparent substrate in a direction perpendicular to the first electrode,
wherein a portion of the first electrode and/or the second electrode in the cell region is partially removed based upon a particular pattern,
wherein a plurality of patterns with a plurality of edge regions, for dispersing an electric field provided to the cell region, are formed in an inner region of the first electrode and/or the second electrode in the cell region in order to uniformly distribute the charged toner particles at the plurality of patterns, and
wherein the plurality of patterns are a plurality of holes formed in the inner region of the first electrode and/or the second electrode.

10. An E-paper panel fabrication method, comprising:
preparing a lower substrate sectionalized by walls and having a lower electrode pattern;
forming a transparent electrode on an upper substrate, and performing a patterning such that the transparent electrode is electrically divided based upon a cell region, and a portion of the transparent electrode corresponding to the cell region is allowed to have a plurality of removed regions; and
injecting charged toner particles into the regions sectionalized by the walls formed on the lower substrate, and coupling the lower substrate and the upper substrate to each other,
wherein a portion of the transparent electrode in the cell region is partially removed based upon a particular pattern,
wherein a plurality of patterns with a plurality of edge regions for dispersing an electric field provided the cell region are formed in an inner region of the transparent electrode in the one cell region,
wherein the plurality of patterns are a plurality of holes formed in the inner region of the transparent electrode, and
wherein each pattern having the plurality of edge regions is formed by removing a portion of the inner region of the transparent electrode in order to uniformly distribute the charged toner particles at the plurality of patterns.

11. The method of claim 10, wherein the patterning to allow the portion of the transparent electrode corresponding to the cell region to have the plurality of removed regions includes removing an inside of the transparent electrode electrically divided based upon the cell region according to a particular pattern, to thereby divide the electrode formed in the cell region into a plurality of sections.

12. The method of claim 10, wherein in the patterning to allow the portion corresponding to the cell region to have the plurality of removed regions, the removed region has at least one type of polygonal type, comb type, lozenge type, round type and stripe type.

13. The method of claim 10, wherein the injecting of the charged toner particles into the region sectionalized by the walls formed on the lower substrate includes mixing plural types of toner particles each of which has different size, mass, color and/or charged degree and thereafter injecting the mixed toner particles into the region.

14. The method of claim 10, wherein the injecting of the charged toner particles into the region sectionalized by the walls formed on the lower substrate includes injecting a solution in which the charged toner particles are mixed and dispersed.

15. The method of claim 10, wherein the preparing of the lower substrate having the lower electrode thereon includes forming a transparent electrode on a transparent lower substrate, and performing a patterning such that the transparent electrode is electrically divided based upon a cell region, and a portion of the transparent electrode corresponding to the cell region is allowed to have a plurality of removed regions.

* * * * *